United States Patent
Buissette et al.

(10) Patent No.: US 9,796,924 B2
(45) Date of Patent: Oct. 24, 2017

(54) PHOSPHOR BASED ON A LANTHANUM CERIUM TERBIUM PHOSPHATE WITH STABILIZED BRIGHTNESS, PREPARATION PROCESS AND USE IN A LUMINESCENT DEVICE

(75) Inventors: Valérie Buissette, Paris (FR); Thierry Le-Mercier, Rosny-sous-Bois (FR)

(73) Assignee: Rhodia Operations, Aubervilliers (FR)

( * ) Notice: Subject to any disclaimer, the term of this patent is extended or adjusted under 35 U.S.C. 154(b) by 687 days.

(21) Appl. No.: 14/240,560

(22) PCT Filed: Aug. 21, 2012

(86) PCT No.: PCT/EP2012/066259
§ 371 (c)(1),
(2), (4) Date: Jun. 11, 2014

(87) PCT Pub. No.: WO2013/030044
PCT Pub. Date: Mar. 7, 2013

(65) Prior Publication Data
US 2014/0295153 A1    Oct. 2, 2014

(30) Foreign Application Priority Data

Aug. 31, 2011   (FR) ..................................... 11 02643

(51) Int. Cl.
C09K 11/77    (2006.01)

(52) U.S. Cl.
CPC ... C09K 11/7777 (2013.01); *Y10T 428/24901* (2015.01); *Y10T 428/25* (2015.01); *Y10T 428/2982* (2015.01)

(58) Field of Classification Search
CPC ................................................ C09K 11/7777
See application file for complete search history.

(56) References Cited

U.S. PATENT DOCUMENTS

| | | |
|---|---|---|
| 3,634,282 A | 1/1972 | Denis et al. |
| 5,567,403 A | 10/1996 | Kimura et al. |
| 5,651,920 A | 7/1997 | Chau et al. |
| 5,746,944 A | 5/1998 | Braconnier |
| 6,419,852 B1 | 7/2002 | Braconnier et al. |
| 2011/0133124 A1* | 6/2011 | Buissette ............... C01B 25/45 252/301.4 P |
| 2011/0272632 A1 | 11/2011 | Buissette et al. |
| 2011/0272633 A1 | 11/2011 | Buissette et al. |
| 2011/0272634 A1 | 11/2011 | Buissette et al. |
| 2011/0272635 A1 | 11/2011 | Buissette et al. |
| 2014/0048743 A1 | 2/2014 | Le-Mercier et al. |

FOREIGN PATENT DOCUMENTS

| | | |
|---|---|---|
| CA | 1211781 A | 9/1986 |
| CN | 1278855 A | 1/2001 |
| CN | 101 270 285 A | 9/2008 |
| EP | 0 581 621 A1 | 2/1994 |
| EP | 0 685 549 A1 | 12/1995 |
| GB | 2124243 A | 2/1984 |
| JP | S57133182 A | 8/1982 |
| JP | S5920378 A | 2/1984 |
| JP | H02276884 A | 11/1990 |
| JP | H0656412 A | 3/1994 |
| WO | 2008012266 A1 | 1/2008 |

OTHER PUBLICATIONS

Meng Xiangfeng, et al—"Preparation of LaPO4Ce, Tb phosphor powder and research on performance thereof", Jan. 2008, Rare Materials and Engineering, vol. 37, Supplement 1, pp. 425-427.

Yuesheng, Sun, et al—"Study on Calcination Conditions of Rare-earth Green-emitting Phosphors LaPO4:Ce, Tb", 2002, Chinese Journal of Liquid Crystals and Displays, 2002, vol. 17, Issue No. 3, pp. 175-181; , Department of Chemical Engineering, Nanchang University, China; 14 pgs. Includes abstract and translation in English.

Peng Hongbo, et al—"Research and production of non ball mill rare-earth phosphate green phosphate powder", 2000, Jiangxi Chemical Industry, Issue No. 4, pp. 16-18. Includes abstract in English.

Ma Lin, et al—"Hydrothermal Growth and Morphology Evolution of CePO4 Aggregates by a Complexing Method", Jan. 9, 2008, Materials Research Bulletin, vol. 43, pp. 2840-2849.

Chauchard, et al—Influence du lithium sur les proprietes optiques de l'orthophosphate de lanthane dope avec Eu3+, Tb3+, Ce3+-Tb3+, 1989, Mat. Res. Bull, vol. 24, No. 10, pp. 1303-1315.

Huo, Ziyang, et al—"Self-assembly of uniform hexagonal yttrium phosphate nanocrystals", 2006, Chem. Comm., The Royal Society of Chemistry, pp. 3522-3524.

Huignard, Arnaud, et al—"Synthesis and luminescence properties of colloidal YVO4:Eu phosphors", 2000, Chem. Mater., vol. 12, Issue No. 4, American Chemical Society, pp. 1090-1094.

Buisette, Valerie, et al—"Colloidal synthesis of luminescent rhabdophane LaPO4:Ln3+.x H2O (Ln=Ce, Tb, Eu; x~0.07) nanocrystals", 2004, Chem. Mater., vol. 16, pp. 3767-3773.

Karpovich, et al—"Synthesis and Characterization of Mixed-Morphology CePO4 Nanoparticles", Jan. 1, 2007, Journal of Solid State Chemistry, vol. 180, pp. 840-846.

* cited by examiner

Primary Examiner — Gerard Higgins

(57) ABSTRACT

The phosphor of the invention is based on a lanthunum cerium terbium phosphate, and it is characterized in that the phosphate consists of particles having a mean size of at most 4 μm, in that it has a lithium content of at most 30 ppm, a boton content of at most 30 ppm and in that it has a variation of brightness between the brightness measured on the phosphor at 25° C. and that measured on the same phosphor at 200° C. of at most 4%.

18 Claims, No Drawings

PHOSPHOR BASED ON A LANTHANUM CERIUM TERBIUM PHOSPHATE WITH STABILIZED BRIGHTNESS, PREPARATION PROCESS AND USE IN A LUMINESCENT DEVICE

CROSS-REFERENCE TO RELATED APPLICATIONS

This application is a U.S. national stage entry under 35 U.S.C. §371 of International Application No. PCT/EP2012/066259 filed Aug. 21, 2012, which claims priority to French Application No. 11/02643, filed Aug. 31, 2011. The entire contents of these applications are explicitly incorporated herein by this reference.

The present invention relates to a phosphor based on a lanthanum cerium terbium phosphate with stabilized brightness, to a process for preparing it, and to its use in a luminescent device.

Mixed lanthanum cerium terbium phosphates are well known for their luminescence properties. They emit a bright green light when they are irradiated by certain high-energy radiation with wavelengths shorter than those in the visible range (UV or VUV radiation for lighting or display systems). Phosphors that exploit this property are commonly used on an industrial scale, as for example in trichromatic fluorescent lamps, in backlighting systems for liquid-crystal displays, or in plasma systems.

Attempts are continually made, moreover, to obtain phosphors whose properties are enhanced, and especially the service properties of these products. Thus, during the manufacture of luminescent devices, the phosphors which are used are subject to high temperatures, which may cause deterioration in their luminescence properties, particularly in their brightness.

There is therefore a need for phosphors whose brightness remains stable even after calcining and during their operation in luminescent devices.

It is an object of the invention to provide a phosphor that meets this requirement.

In this aim, the phosphor of the invention is based on a lanthanum cerium terbium phosphate and is characterized in that the phosphate consists of particles having an average size of not more than 4 µm, in that it has a lithium content of not more than 30 ppm and a boron content of not more than 30 ppm, and in that it has a variation in brightness between the brightness measured on the phosphor at 25° C. and that measured on the same phosphor at 200° C. of not more than 4%.

The invention also relates to a process for preparing a phosphor of this kind, said process being characterized in that it comprises the following steps:

a) introducing, continuously and with stirring, a first solution comprising soluble salts of the elements lanthanum, cerium and terbium into a second solution comprising phosphate ions and having an initial pH of less than 2, thereby forming a precipitate, and, during the introduction of the first solution into the second, maintaining the pH of the precipitation medium at a constant value of less than 2;

b) recovering the resulting precipitate;

c) calcining the precipitate at a temperature of not more than 1000° C.;

d) heat-treating the precipitate obtained from step c) under a reducing atmosphere, in the presence of lithium tetraborate ($Li_2B_4O_7$) in a quantity by mass of not more than 0.2%, at a temperature of between 1050° C. and 1150° C. and over a time of between 2 hours and 4 hours.

Other features, details, and advantages of the invention will emerge more fully from a reading of the description to follow and also of the various specific but nonlimiting examples intended for its illustration.

It is also specified that, for the remainder of the description, unless otherwise indicated, in all the ranges or limits of values that are given, the values at the bounds are included, the ranges or limits of values thus defined therefore covering any value at least equal to and greater than the lower bound and/or at most equal to or less than the upper bound.

As indicated above, the phosphor is based on a lanthanum cerium terbium phosphate of orthophosphate type, of formula $LnPO_4$, where Ln denotes the elements lanthanum, cerium, and terbium.

According to a more particular embodiment of the invention, the phosphor consists essentially—since the presence of other, residual phosphate species is possible—and, preferably, entirely or solely of the aforementioned phosphate.

The phosphate of the phosphor of the invention exhibits a monazite crystal structure. This crystal structure may be demonstrated by the technique of X-ray diffraction (XRD). According to one preferred variant, the phosphors of the invention are pure phases, meaning that the XRD diagrams reveal just a single monazite phase. The phosphors of the invention, however, may also not be pure phases, and in that case the XRD diagrams of the products show the presence of very minor residual phases.

More particularly, the lanthanum cerium terbium phosphate may conform to the formula $(La_xCe_yTb_z)PO_4$ (1) in which x, y and z satisfy the following formulae:

$$x+y+z=1$$

$$0.2 \leq y \leq 0.45$$

$$0.1 \leq z \leq 0.2.$$

More particularly, y may satisfy the relation $0.2 \leq y \leq 0.35$, and z may satisfy the relation $0.13 \leq z \leq 0.16$.

According to another feature of the phosphor of the invention, the lanthanum cerium terbium phosphate consists of particles having an average size or mean diameter of not more than 4 µm, more particularly not more than 3.5 µm, and more particularly still not more than 3.2 µm. This mean diameter may in particular be between 2.5 µm and 4 µm, and more particularly between 2.5 µm and 3.5 µm.

The mean diameter in question is the volume average of the diameters in a population of particles.

The particles in question here may be aggregates of other, finer particles, in aggregated form, referred to as "primary particles". In the remainder of the description, the term "particle" applies not to these primary particles but to those referred to above with a mean diameter of not more than 4 µm, unless otherwise indicated.

The particle size values given here, and for the remainder of the description, are measured by the technique of laser particle size analysis, using, for example, a Malvern laser particle size analyzer, on a sample of particles dispersed in water using ultrasound (130 W) for 1 minute 30 seconds.

Furthermore, the particles preferably have a low dispersion index, typically not more than 0.7, more particularly not more than 0.6, and more particularly still not more than 0.5.

The "dispersion index" of a population of particles is understood, in the sense of the present description, to mean the ratio I as defined below:

$$I=(D_{84}-D_{16})/(2\times D_{50}),$$

where: $D_{84}$ is the particle diameter for which 84% of the particles have a diameter smaller than $D_{84}$;

$D_{16}$ is the particle diameter for which 16% of the particles have a diameter smaller than $D_{16}$; and $D_{50}$ is the mean diameter of the particles, the diameter for which 50% of the particles have a diameter smaller than $D_{50}$.

The phosphor of the invention is also characterized by its lithium and boron content.

This lithium content is not more than 30 ppm, in particular not more than 20 ppm. It may more particularly be not more than 15 ppm.

Furthermore, the phosphor of the invention has a boron content of not more than 30 ppm, more particularly of not more than 20 ppm, and more particularly still 15 ppm.

It will be noted here, and for the entirety of the description, that the lithium and boron content is measured by the ICP (Inductively Coupled Plasma)—AES (Atomic Emission Spectroscopy) or ICP—OES (Optical Emission Spectroscopy) technique and after complete attack of the product.

Another particularly noteworthy feature of the phosphor of the invention is its brightness. This brightness is stable. This means that it does not vary significantly with temperature. More specifically, the variation is not more than 4% between the brightness ($B_{25}$) measured for the phosphor at 25° C. and the brightness ($B_{200}$) of this phosphor measured at 200° C. ($[B_{25}-B_{200}]/B_{25} \leq 0.04$). This variation in brightness may more particularly be not more than 3%, and more particularly still not more than 2%.

The brightness of a phosphor may be quantified by the conversion yield of the phosphor, which corresponds to a ratio between the number of photons emitted by a phosphor and the number of photons that form the excitation beam. The conversion yield of a phosphor is evaluated by measuring, in the visible range of the electromagnetic spectrum, the emission of a phosphor under excitation in the UV or VUV range, generally at a wavelength of less than 280 nm. The brightness value is obtained by integrating the emission intensity between 400 nm and 780 nm.

According to particular embodiments of the invention, the phosphor is based on a lanthanum cerium terbium phosphate which has a specific sodium or potassium content and a monazite crystal structure.

More specifically, and according to a first variant of the abovementioned particular embodiments, the phosphors of the invention are based on a phosphate as stated above and comprise potassium in an amount of not more than 350 ppm. This amount is expressed by a mass of potassium element relative to the total mass of the phosphate.

The minimum amount of potassium may correspond to the minimum value detectable by the analytic technique used to measure the potassium content. Generally speaking, however, this minimum amount is at least 10 ppm, more particularly at least 40 ppm, and more particularly still at least 50 ppm. This amount of potassium may more particularly be between a value greater than or equal to 100 ppm and not more than 350 ppm, or else between a value greater than 200 ppm and 350 ppm.

According to one particular variant, the phosphor contains no element other than potassium as alkali metal element, and optionally lithium.

According to a second variant of the abovementioned particular embodiments, the phosphors of the invention are based on a phosphate as stated above and comprise sodium in an amount of not more than 350 ppm, more particularly not more than 250 ppm, and more particularly still not more than 100 ppm. This amount, again, is expressed by a mass of sodium element relative to the total mass of the phosphate.

The minimum amount of sodium may also correspond to the minimum value detectable by the analytical technique used to measure the sodium content. Generally speaking, however, this amount is at least 10 ppm and more particularly at least 50 ppm.

According to one particular variant, the phosphor contains no element other than sodium as alkali metal element, and optionally lithium.

Here as well, and for the entirety of the description, it is specified that the amount of potassium or of sodium is measured according to two techniques. The first is the technique of X-ray fluorescence, allowing measurement of amounts of potassium or of sodium that are at least approximately 100 ppm. This technique will be used more particularly for phosphors having the highest amounts of potassium or of sodium. The second technique is the ICP (Inductively Coupled Plasma)—AES (Atomic Emission Spectroscopy) or ICP—OES (Optical Emission Spectroscopy) technique. This technique will be used more particularly here for phosphors for which the amounts of potassium or of sodium are lowest, in particular for amounts of less than approximately 100 ppm.

The process for preparing the phosphor of the invention will now be described.

According to the invention, in a first step (a), a lanthanum cerium terbium phosphate is precipitated directly and at controlled pH, by reacting a first solution comprising salts of the elements lanthanum, cerium, and terbium, Ln elements, these salts being then present in the proportions required to obtain the product of desired composition, with a second solution comprising phosphate ions.

According to a first important feature of the process, it is necessary to observe a particular order of introduction of the reactants, and, more specifically, the solution of the salts of the Ln elements must be introduced, gradually and continuously, into the solution comprising phosphate ions.

According to a second important feature of the process according to the invention, the initial pH of the solution comprising phosphate ions must be less than 2, and preferably between 1 and 2.

According to a third feature, the pH of the precipitation medium must subsequently be maintained at a pH value of less than 2, and preferably of between 1 and 2.

By "controlled pH" is meant the holding of the pH of the precipitation medium at a particular, constant or substantially constant, value, by addition of a basic compound to the solution comprising phosphate ions, simultaneously to the introduction into said solution of the solution comprising the salts of the Ln elements. The pH of the medium will therefore vary not more than 0.5 pH unit around the fixed setpoint value, and more preferably not more than 0.1 pH unit around this value. The fixed setpoint value will correspond advantageously to the initial pH (less than 2) of the solution comprising phosphate ions.

The precipitation is carried out preferably in aqueous medium at a temperature which is not critical and which, advantageously, is between the ambient temperature (15° C.-25° C.) and 100° C. This precipitation takes place with stirring of the reaction mixture.

The concentrations of the salts of the Ln elements in the first solution may vary within broad limits. Accordingly, the total concentration of these element salts may be between 0.01 molliter and 3 molliter.

The salts of the Ln elements that are suitable for the invention are, in particular, salts which are soluble in aqueous medium, such as, for example, nitrates, chlorides, acetates, carboxylates, or a mixture of these.

The phosphate ions intended for reaction with the solution of the salts of the Ln elements may be provided by compounds which are pure or in solution, as for example phosphoric acid, alkali metal phosphates or phosphates of other metallic elements that give a soluble compound with the anions associated with the Ln elements.

The phosphate ions are present in an amount such that the molar $PO_4/Ln$ ratio between the two solutions is greater than 1, and advantageously between 1.1 and 3.

As emphasized above in the description, the solution comprising phosphate ions must initially (that is, before the start of introduction of the solution of salts of Ln elements) have a pH of less than 2, and preferably of between 1 and 2. Therefore, if the solution used does not naturally have such a pH, its pH is brought to the appropriate desired value either by addition of a basic compound or by addition of an acid (for example, hydrochloric acid, in the case of an initial solution with too high a pH).

Subsequently, during the introduction of the solution comprising the salts of Ln elements, the pH of the precipitation medium gradually drops; accordingly, according to one of the features of the process according to the invention, in the aim of holding the pH of the precipitation medium at the desired constant working value, said pH necessarily being less than 2 and preferably between 1 and 2, a basic compound is introduced simultaneously into said medium.

Basic compounds suitable for the invention include, by way of example, metal hydroxides (NaOH, KOH, $Ca(OH)_2$, etc.) or ammonium hydroxide, or any other basic compound whose constituent species will not form any precipitate during their addition to the reaction mixture, by combination with one of the species otherwise present in that mixture, and allowing maintenance of the pH of the precipitation medium.

According to one preferred embodiment of the invention, this basic compound is advantageously a compound which is readily removable, either with the liquid phase of the reaction mixture and washing of the precipitate, or by thermal decomposition during the calcining of the phosphate.

Accordingly, the preferred basic compound of the invention is ammonia, which is advantageously employed in the form of an aqueous solution.

At the end of the precipitation, it is possible, optionally, to carry out aging by holding the reaction mixture obtained beforehand at a temperature situated within the same temperature range as that in which the precipitation took place, for a time which may be between a quarter of an hour and an hour, for example.

In the next step (b), the precipitate may be recovered by any means known per se, more particularly by simple filtration. Under the conditions of the process according to the invention, indeed, a compound is precipitated that comprises a nongelatinous, filterable phosphate.

The product recovered is subsequently washed, with water for example, and then dried.

In the following step (c), the product is subjected to a first heat treatment or a first calcining.

The calcining temperature is generally not more than 1000° C., more particularly not more than approximately 900° C., and it is at least 650° C.

The higher the temperature, generally, the lower the calcining time. Solely by way of example, this time may be between 1 and 3 hours, and should be understood as a hold time at the temperature given above.

This first calcining takes place generally in air.

At the end of this first heat treatment, a product is obtained which may be considered as a precursor of the phosphor of the invention, to the extent that this precursor does not have luminescent properties sufficient from a commercial standpoint.

To obtain the phosphor of the invention, this precursor is required to undergo a second heat treatment.

This second heat treatment is conducted in general in a reducing atmosphere ($H_2$, $N_2/H_2$ or $Ar/H_2$, for example).

According to an essential feature of the invention, it takes place in the presence of a flux, or fluxing agent, which is lithium tetraborate ($Li_2B_4O_7$). The fluxing agent is mixed with the precursor for treatment in an amount of tetraborate which is not more than 0.2% by mass of tetraborate relative to the combination of fluxing agent+precursor. This amount may more particularly be between 0.1% and 0.2%.

The temperature of the treatment is between 1050° C. and 1150° C. The duration of the treatment is between 2 and 4 hours, this duration being understood to be a hold time at the temperature given above.

Following treatment, the particles are advantageously washed, to give a phosphor which is as pure as possible and is in a deagglomerated state or a state of low agglomeration. In the latter case, the phosphor can be deagglomerated by subjecting it to a deagglomeration treatment under mild conditions—for example, using a ball mill.

However, and according to one advantageous variant of the process of the invention, the product obtained from the second heat treatment may be redispersed in hot water.

This redispersion takes place by introduction of the solid product into water, with stirring. The resulting suspension is held with stirring for a time which may be between approximately 1 and 6 hours, more particularly between approximately 1 and 3 hours.

The temperature of the water may be at least 30° C., more particularly at least 60° C., and it may be between approximately 30° C. and 90° C., preferably between 60° C. and 90° C., under atmospheric pressure. The solid product in suspension is then separated from the liquid medium by any known means. It may be subsequently washed and/or dried. If necessary, the product may lastly be deagglomerated as described above.

It may be noted that the second heat treatment according to the process of the invention brings about a slight variation between the size of the particles of the precursor and those of the phosphor. This variation is generally not more than 20%, more particularly not more than 10%. It is consequently unnecessary to mill the phosphor in order to return its average particle size back to the average size of the particles of the initial precursor.

The absence of milling, or the implementation of a simple deagglomeration in the process for preparing the phosphors, produces products which exhibit few or no surface defects, thereby helping to enhance the luminescence properties of these products. SEM micrographs of the products show, indeed, that their surface is substantially smooth. More particularly, an effect of this is to limit the interaction of the products with mercury when said products are employed in mercury vapor lamps, and therefore of constituting an advantage in their use.

A description will now be given of the processes for preparing phosphors according to the particular embodiments referred to above, namely phosphors based on a phosphate having monazite structure and comprising sodium or potassium.

These processes are essentially similar to the more general process which has been described above. The description given above for this general product therefore applies here as well, albeit with the differences which will be stated hereinbelow.

Accordingly, and for the preparation of a phosphor based on a phosphate comprising potassium, chlorides are used as salts of the Ln elements for the above-described step (a). Furthermore, the basic compound which is used either to bring the initial pH of the second solution comprising phosphate ions to a value of less than 2 or for maintaining the pH during precipitation is, at least in part, potassium hydroxide. By "at least in part" is meant that it is possible to use a mixture of basic compounds in which at least one is potassium hydroxide. The other basic compound may be, for example, aqueous ammonia. According to one preferred embodiment, a basic compound is used which is solely potassium hydroxide, and according to another, even more preferable embodiment, potassium hydroxide is used alone and for the two aforementioned operations, in other words both for bringing the pH of the second solution to the appropriate value and for maintaining the pH of precipitation. In these two latter preferred embodiments, there is reduction in or absence of disposal of nitrogen-containing products that might be introduced by a basic compound such as aqueous ammonia.

Another difference of this particular process relative to the general process described above lies in the fact that the product obtained from the first calcination is subsequently redispersed in hot water.

This redispersion takes place by introduction of the solid product into water, with stirring. The resulting suspension is held with stirring for a time which may be between approximately 1 and 6 hours, more particularly between approximately 1 and 3 hours.

The temperature of the water may be at least 30° C., more particularly at least 60° C., and it may be between approximately 30° C. and 90° C., preferably between 60° C. and 90° C., under atmospheric pressure. It is possible to carry out this operation under pressure, as for example in an autoclave, at a temperature which may then be between 100° C. and 200° C., more particularly between 100° C. and 150° C.

In a last step, the solid is separated from the liquid medium by any means known per se, as for example by simple filtration. It is possible optionally to repeat the redispersion step one or more times under the conditions described above, optionally at a temperature different from that at which the first redispersion was carried out.

For the preparation of a phosphor based on a phosphate comprising sodium, the process used, here again, is similar to the general process described above, but with the first difference of the use in step (a) of chlorides as salts of the Ln elements. Furthermore, the basic compound which is used either for bringing the initial pH of the second solution comprising phosphate ions to a value of less than 2 or for maintaining the pH during the precipitation is, at least in part, sodium hydroxide. By "at least in part" is meant that it is possible to use a mixture of basic compounds in which at least one is sodium hydroxide. The other basic compound may be, for example, aqueous ammonia. According to one preferred embodiment, a basic compound is used which is solely sodium hydroxide, and according to another, even more preferred embodiment, sodium hydroxide alone is used for the two aforementioned operations, in other words for bringing the pH of the second solution to the appropriate value and for maintaining the pH of precipitation. In these two latter preferred embodiments, there is reduction in or absence of disposal of nitrogen-containing products that might be introduced by a basic compound such as aqueous ammonia.

Lastly, as in the case of the preparation of a phosphor comprising potassium, the product obtained from the first calcination is subsequently redispersed in hot water. The description given above for this redispersion applies equally here.

The invention also relates to a phosphor based on a lanthanum cerium terbium phosphate, this phosphate consisting of particles having an average size of not more than 4 µm and having a lithium content of not more than 30 ppm and a boron content of not more than 30 ppm, this phosphor being obtainable by the preparation process which has just been described above.

This phosphor exhibits all of the technical features given above in the description, particularly the crystallographic features, composition features (see, in particular, formula (1) above), particle size features, and dispersion index features. It also exhibits the brightness stability described above, i.e., a variation in brightness ($[B_{25}-B_{200}]/B_{25}$) of not more than 0.4. Furthermore, everything stated for the preparation process applies equally here with regard to the definition of this phosphor.

The phosphors of the invention exhibit intense luminescence properties in green for electromagnetic excitations corresponding to the various fields of absorption of the product.

Accordingly, the phosphors of the invention may be used in lighting or display systems featuring a source of excitation in the UV (200-280 nm) range, around 254 nm, for example. This includes more particularly trichromatic lamps, especially mercury vapor lamps, and lamps for the backlighting of liquid-crystal systems, in tube or flat form (LCD backlighting).

The phosphors of the invention are also good candidates as green phosphors for VUV (or "plasma") excitation systems, as for example plasma screens and mercury-free trichromatic lamps, particularly xenon excitation lamps (in tube or flat form).

The phosphors of the invention may also be used as green phosphors in devices featuring excitation by light-emitting diode. They may be used, particularly, in systems which can be excited in the near-UV.

They may also be used in UV excitation marking systems.

The phosphors of the invention may be employed in lamp and screen systems using well-known techniques, as for example by screen printing, by electrophoresis, or by sedimentation.

They may also be dispersed in organic matrices (for example, plastics matrices or polymers that are transparent under UV, etc.), inorganic matrices (for example, silica), or organic-inorganic hybrid matrices.

According to another aspect, the invention also relates to the luminescent devices of the aforementioned type comprising the phosphors of the invention as a source of green luminescence.

These devices may be UV excitation devices, especially trichromatic lamps, more particularly mercury vapor lamps, backlighting lamps of liquid-crystal systems, plasma screens, xenon excitation lamps, light-emitting diode excitation devices, and UV excitation marking systems.

Examples will now be given.

EXAMPLE 1

This example relates to the preparation of a precursor of a phosphor according to the invention.

In a 1 liter beaker, a solution of rare earth nitrates (solution A) is prepared as follows: 171.5 g of a 3.0 M La(NO$_3$)$_3$ solution, 179.8 g of a 2.88 M Ce(NO$_3$)$_3$ solution, 54.5 g of a 2.57 M Tb(NO$_3$)$_3$ solution, and 107.7 mL of deionized water are mixed, giving a total of 0.7 mol of rare earth nitrates, corresponding to a composition (La$_{0.44}$Ce$_{0.43}$Tb$_{0.13}$) (NO$_3$)$_3$.

In a 1 liter reactor, 436 ml of deionized water, admixed with 29.4 g of 85% Normapur H$_3$PO$_4$ and then 28% aqueous ammonia NH$_4$OH, to give a pH of 1.7, are introduced (solution B). The solution is heated to 60° C. Solution A prepared above is added to the mixture, slowly and with stirring, at temperature (60° C.) and with the pH regulated to 1.7. The resulting mixture is aged at 60° C. for 15 minutes. At the end of aging, the solution has a milky white appearance. It is left to cool to 30° C. It is filtered on a frit and washed with two liters of water, after which it is dried and calcined in air at 900° C. for 2 hours.

This gives a monazite-phase rare earth phosphate, (La,Ce,Tb)PO$_4$. The particles have a D$_{50}$ of 3.0 μm, with a dispersion index of 0.5.

EXAMPLE 2

This example relates to the preparation of a phosphor according to the invention.

The precursor obtained in example 1 is calcined at 1100° C. for 4 hours under a reducing atmosphere (Ar/H$_2$) in the presence of 0.1% by weight of lithium borate, Li$_2$B$_4$O$_7$ relative to the amount of (La,Ce,Tb)PO$_4$ precursor. The resulting product is then redispersed in hot water at 60° C., filtered on a Buchner filter, and then washed with 1 L of water.

It is subsequently dried in an oven at 60° C. overnight. Subsequently it is deagglomerated by a 30-minute ball mill treatment, and then screened.

The particles have a D$_{50}$ of 3.2 μm, with a dispersion index of 0.6.

The luminescence yield is set at 100% as a reference.

The boron content noted is 19 ppm; the lithium content measured is 12 ppm.

COMPARATIVE EXAMPLE 3

This example relates to the preparation of a phosphor, using a flux different from that used to prepare the phosphor according to the invention.

The precursor obtained in example 1 is calcined at 1000° C. for 3 hours under a reducing atmosphere (Ar/H$_2$) in the presence of 1% by weight of lithium fluoride, LiF, relative to the amount of (La,Ce,Tb)PO$_4$ precursor. To facilitate the disintegration of the resulting product, it is subsequently redispersed in a 5% nitric acid solution, filtered on a Büchner filter and subsequently washed with 5 L of water. It is subsequently dried in an oven at 60° C. overnight. Thereafter it is deagglomerated by a 1-hour ball mill treatment, and then screened.

The particles have a D$_{50}$ of 4.5 μm, with a dispersion index of 0.5.

The luminescence yield measured at 25° C. is 99% relative to the product from example 2.

COMPARATIVE EXAMPLE 4

This example relates to the preparation of a phosphor, using a flux different from that used to prepare the phosphor according to the invention.

The precursor obtained in example 1 is calcined at 1000° C. for 3 hours under a reducing atmosphere (Ar/H$_2$) in the presence of 52.3% by weight of boric acid and 0.85% of Li$_2$CO$_3$, relative to the amount of (La,Ce,Tb)PO$_4$ precursor. To facilitate the disintegration of the resulting product, it is subsequently redispersed in a 5% nitric acid solution, filtered on a Buchner filter and subsequently washed with 3 L of water, then redispersed in a 5% potassium hydroxide solution, filtered and washed with 3 L of water.

It is subsequently dried in an oven at 60° C. overnight, and then screened.

The particles have a D$_{50}$ of 7.3 μm, with a dispersion index of 1.2.

The luminescence yield measured at 25° C. is 98% relative to the product from example 2.

The boron content is 530 ppm, and the lithium content 44 ppm.

The variations in brightness are given in the table below.

| | B$_{25}$ | B$_{200}$ | Variation |
|---|---|---|---|
| Example 2 | 100 | 98 | 2% |
| Example 3 | 99 | 80 | 19% |
| Example 4 | 98 | 91 | 7% |

The brightness at 200° C. is measured on a phosphor which is held at 200° C. on a hotplate (temperature raised in stages of 20° C., with 15 minutes per stage).

The invention claimed is:

1. A process for preparing a phosphor, the process comprising:
    a) introducing, continuously and with stirring, a first solution comprising soluble salts of the elements lanthanum, cerium and terbium into a second solution comprising phosphate ions and having an initial pH of less than 2, thereby forming a precipitate, and, during the introduction of the first solution into the second solution, maintaining the pH of the precipitation medium at a constant value of less than 2;
    b) recovering the resulting precipitate;
    c) calcining the precipitate at a temperature of not more than 1000° C.;
    d) heat-treating the calcined precipitate under a reducing atmosphere, in the presence of lithium tetraborate (Li$_2$B$_4$O$_7$) in a quantity by mass of not more than 0.2%, at a temperature of between 1050° C. and 1150° C. and over a time of between 2 hours and 4 hours, wherein the lanthanum cerium terbium phosphate consists of particles having an average size of not more than 4 μm, wherein the phosphor has a lithium content of not more than 30 ppm and a boron content of not more than 30 ppm, and wherein the brightness of the phosphor at 25° C. does not vary by more than 4% from the brightness of the same phosphor at 200° C.

2. The process as claimed in claim 1, wherein the pH of the precipitation medium is held constant at a value of between 1 and 2.

3. The process as claimed in claim 1, wherein the pH of the precipitation medium is maintained by addition of a basic compound.

4. The process as claimed in claim 3, wherein the pH of the precipitation medium is maintained by addition of ammonium hydroxide.

5. The process as claimed in claim 1, wherein the phosphate ions of the second solution are in the form of a phosphoric acid solution.

6. The process as claimed in claim 1, wherein the quantity of lithium tetraborate is between 0.1% and 0.2%.

7. The process as claimed in claim 1, wherein the product obtained from step d) is redispersed in water at a temperature of at least 30° C., to give a suspension, then held in suspension and lastly separated from the liquid medium of said suspension.

8. A phosphor based on a lanthanum cerium terbium phosphate heat treated in the presence of lithium tetraborate ($Li_2B_4O_7$), wherein the phosphate consists of particles having an average size of not more than 4 μm, wherein the phosphor has a lithium content of not more than 30 ppm and a boron content of not more than 30 ppm, and wherein the brightness of the phosphor at 25° C. does not vary by more than 4% from the brightness of the same phosphor at 200° C.

9. The phosphor as claimed in claim 8, wherein the brightness of the phosphor at 25° C. does not vary by more than 2% from the brightness of the same phosphor at 200° C.

10. The phosphor as claimed in claim 8, wherein the phosphate consists of particles having an average size of not more than 3.5 μm.

11. The phosphor as claimed in claim 8, wherein the phosphate consists of particles having an average size of between 2.5 μm and 4 μm.

12. The phosphor as claimed in claim 11, wherein the phosphate consists of particles having an average size of between 2.5 μm and 3.5 μm.

13. The phosphor as claimed in claim 8, wherein the phosphate consists of particles having a dispersion index of not more than 0.7.

14. The phosphor as claimed in claim 8, wherein the lanthanum cerium terbium phosphate conforms to the formula $(La_xCe_yTb_z)PO_4$ in which x, y and z satisfy the following formulae:

$x+y+z=1$ $0.2 \leq y \leq 0.45$; and $0.1 \leq z \leq 0.2$.

15. A method for forming a UV excitation device, the method comprising depositing a phosphor of claim 8 onto a support by screen printing, electrophoresis, or sedimentation, such that a UV excitation device is formed.

16. A luminescent device comprising a phosphor as claimed in claim 8 as green luminescence source.

17. The luminescent device as claimed in claim 16, characterized in that it is a UV excitation device.

18. The luminescent device as claimed in claim 16, wherein the device is selected from a trichromatic lamp, a mercury vapor lamps, a lamp for backlighting liquid-crystal systems, a plasma screen, a xenon excitation lamp, a light-emitting diode excitation device and a UV excitation marking system.

* * * * *